(12) United States Patent
Rosenshine (10) Patent No.: US 10,842,062 B1
(45) Date of Patent: Nov. 24, 2020

(54) SHOVEL WITH AUXILIARY HANDLE

(71) Applicant: Howard Rosenshine, Downingtown, PA (US)

(72) Inventor: Howard Rosenshine, Downingtown, PA (US)

( * ) Notice: Subject to any disclaimer, the term of this patent is extended or adjusted under 35 U.S.C. 154(b) by 0 days.

(21) Appl. No.: 14/073,681

(22) Filed: Nov. 6, 2013

Related U.S. Application Data (60) Provisional application No. 61/729,592, filed on Nov. 24, 2012.

(51) Int. Cl.
*A01B 1/02* (2006.01)

(52) U.S. Cl.
CPC .................... *A01B 1/026* (2013.01)

(58) Field of Classification Search
CPC ............ A01B 1/026; B25G 1/00; B25F 5/026
USPC ...................... 294/58, 178; 16/426
See application file for complete search history.

(56) References Cited

U.S. PATENT DOCUMENTS

| | | | | |
|---|---|---|---|---|
| 911,291 | A * | 2/1909 | Byor .............................. | 294/58 |
| 2,521,441 | A * | 9/1950 | Bickley ......................... | 294/58 |
| 4,911,575 | A * | 3/1990 | Tidwell .......................... | 404/97 |
| 5,431,468 | A * | 7/1995 | Rosenshine .................... | 294/58 |
| 6,830,271 | B2 * | 12/2004 | Piscopo et al. ................. | 294/58 |
| 7,300,081 | B1 * | 11/2007 | Murray et al. .................. | 294/58 |
| 2007/0145757 | A1 * | 6/2007 | Wu ............................... | 294/58 |

* cited by examiner

*Primary Examiner* — Dean J Kramer
(74) *Attorney, Agent, or Firm* — Keeley DeAngelo LLP; W Scott Keeley (57) ABSTRACT

An improved, spring biased auxiliary handle for a shovel that is based on an elongated flat spring is presented. It will reduce back pain strain and injury, cardiovascular strain, fatigue and shoveling time, relative to the same task performed without the assistance of said device.

8 Claims, 11 Drawing Sheets

SHOVEL WITH AUXILIARY HANDLE

This application claims priority to Provisional Application Ser. No. 61/729,592 filed Nov. 24, 2012, the content of which is incorporated by reference.

This application relates to an improved auxiliary handle for a shovel.

BACKGROUND

Lifting snow, or some other substance, with a standard straight shaft shovel involves substantial bending on the part of the user during the shoveling of the load. This bending, while lifting a load, can cause the user substantial back strain and/or back injury.

In addition to lifting, shoveling also involves digging or scraping, before lifting the load, and throwing or discharging after lifting the load. The combination of scraping, lifting and throwing heavy loads, such as snow, places a great deal of stress on the cardiovascular system of the user. This leads to fatigue for virtually all users. Additionally, this stress is known to be a cause of adverse cardiovascular events, such as heart attack, in those who are prone to such events.

The ideal shoveling mechanism, then, would be one which eliminates the adverse bending, and which also reduces the fatigue and stress mentioned above. Further, it would not reduce any functionality that is already present in existing accepted shovel designs and solutions.

Straight shaft shovels with a rigidly attached second handle can indeed eliminate the bending involved during lifting the load. However, they impose a major handicap during the throwing phase. The lack of any "give" forces the user to absorb an unacceptable shock wave after the load is discharged, during the process of stopping the motion of the shovel.

Note that while a standard straight shaft shovel is itself rigid, the user will subconsciously ease the grip on the hand gripping the shovel shaft, to let the shaft slide, and gradually slow the shovel to a stop without incurring the shock mentioned above.

Shovels may also have second handles attached, which are freely pivoting or rotating. These allow lifting with a straight back, and they have to give to avoid the shock associated with discharging the load. However, they too impose an unacceptable side effect, namely that trying to control the freely articulated handles and joint in such an arrangement, while scraping, lifting and throwing is extremely difficult.

The well-known "bent shaft" shovels also allow the user to shovel with a somewhat straighter back, under some conditions. As well, they allow the shaft to slide during discharge, to avoid user shock, like the straight shaft shovels. However, bent shaft shovels impose their own set of trade-offs. They make discharging or throwing much harder, since the load is now on the end of a bent lever arm, which creates substantial and undesirable torque during the process of throwing. In addition, they cause the angle of attack of a snow shovel blade with the ground to be too shallow to allow effective scraping and digging.

In U.S. Pat. No. 5,431,468 to Rosenshine discloses an auxiliary handle for a shovel which uses a torsional spring interposed between the main shaft and the auxiliary shaft of a two-handled shovel arrangement. This torsional spring biases the shafts such that the handle grips are forced apart by the torsional spring. This spring biased shaft provides the "give" necessary so that no undue shock is delivered to the user during shoveling. This spring also affords the user enough inherent control so that, unlike the freely articulated handles, no undue effort is required to control the shovel during the act of shoveling.

Rosenshine U.S. Pat. No. 5,431,468 also discloses a passive locking mechanism, whereby the act of scraping or digging causes the auxiliary shaft to become temporarily fixed relative to the main shovel shaft, during the act of digging or scraping, A rigid arrangement is preferable during digging and scraping, and thus this mechanism allows for the optimal configuration during digging (fixed) as well as throwing (articulated and spring biased).

Byor U.S. Pat. No. 911,291 discloses a spring biased auxillary shovel handle based on a resilient shaft. However none of the necessary parameters, such as attachment angle or degree of resilience necessary for a successful device, are described. Indeed, the embodiment and description given in Byor will not provide for a successful snow removal tool.

SUMMARY

The device presented contains the specifications and constraints necessary to construct a spring biased auxiliary handle for a shovel, or shovel like implement such as a digging or fork or a pitch fork, to be used for removal or loading of snow or other bulk load material, which is based on the use of an auxiliary handle shaft that is composed, in part, of an elongated flat leaf spring.

The leaf spring biases the handles apart during throwing, which allows for elimination of discharge shock, which is problematic in rigid auxiliary handle arrangements. It also allows for control of the load during the throw, which is a problem with freely articulated auxiliary handles. It will absorb excess kinetic energy, left over from the throw, and use this energy to assist in returning the shovel to its starting position.

The angle of attachment of the auxiliary handle, as well as the other body parameters that this dictates, allow the user to lift and throw with the strong muscles of the upper body, as opposed to the relatively weak muscles of the upper and lower arms.

This can be thought of as swinging the load in an arc, instead of lifting it vertically and then pushing.

The leaf spring can also flex modestly away from the main shaft during lifting, to facilitate the lifting itself, as well as "cocking", in preparation for the throw.

In addition, it allows for a simple and natural passive locking mechanism, which (partially) locks the positions of the grips on the main and auxiliary shaft relative to each other, during scraping or digging. This makes two handed digging or scraping easier.

The use of a two-handled shovel of this design makes it much easier to "switch sides" when shoveling. This effect as well will assist in reducing fatigue and injury.

The combination of these improvements will greatly reduce each of the following, which are inflicted on the user:

1) Back pain, strain or other muscular injury from shoveling
2) Fatigue during shoveling
3) Cardiovascular stress during shoveling The system greatly reduces the effort, strain and potential injury involved in shoveling. It is a spring-loaded, ergonomic shovel handle attachment that attaches easily to any straight-shaft shovel, or similar implement. By adding the system to a standard shovel, you'll have a truly ergonomic shovel. The system allows you to lift without bending or twisting your back. This is a huge advantage in terms of eliminating shoveling-related back pain and back injury.

Strong muscles of the upper body can be used to do the lifting and throwing, rather than relying on biceps and triceps, which are much weaker. The system requires roughly 50% fewer shoveling motions than a traditional shovel. This greatly reduces the energy needed to shovel a given load. Under a Methods Time Measurement (MTM-2) study, a standard engineering benchmark, the system is roughly three times faster than a traditional shovel to complete a shoveling cycle. The system captures the "wasted" energy from throwing and uses that energy to return the shovel to the starting point, ready for the next throw. With a traditional shovel, the user must expend his or her energy after each throw to get ready for the next. This is similar to the way that a hybrid automobile captures energy that would otherwise be lost in braking.

The system allows the user to switch sides when lifting and throwing. This evens the stress on the entire body, including the back, further reducing strain and injury. It allows one set of muscles to rest while the other is in use, further easing the shoveling effort and speeding up the process of shoveling.

The system allows tall people to shovel effectively and without the usual pain or discomfort. The taller the user is, the longer the shovel required. Yet snow shovels are basically "one size fits all." The system changes the geometry of the shoveling motion such that this issue is greatly reduced, or eliminated for tall shovelers.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Figure 1:
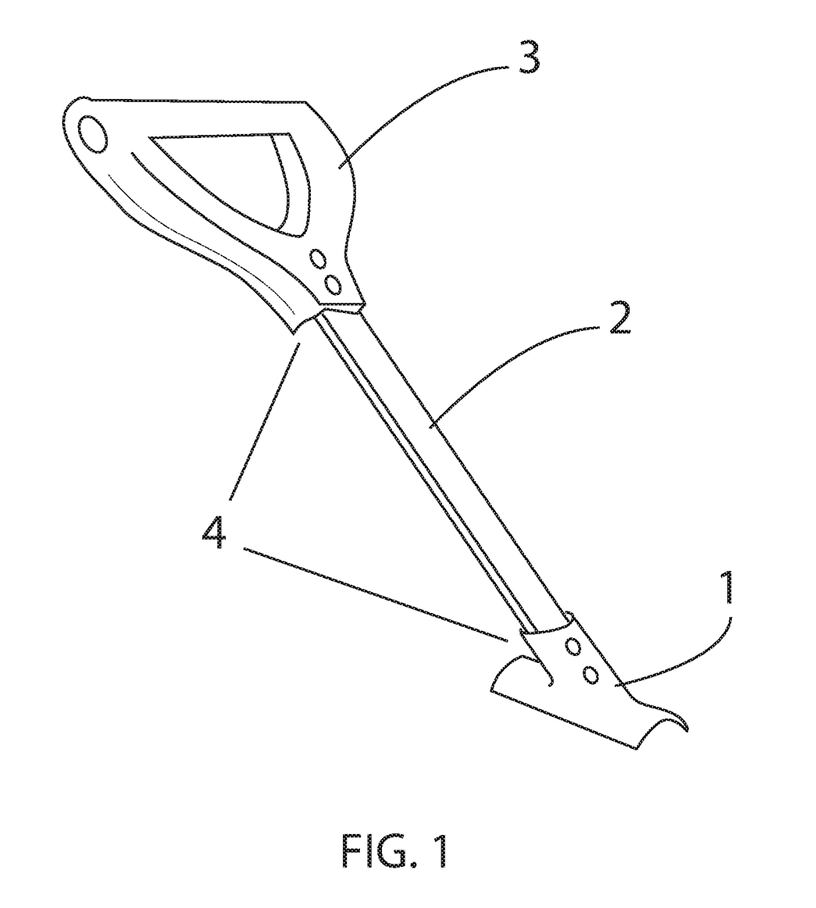
FIG. 1 shows an exemplary auxiliary handle front view.

FIG. 1 shows an exemplary auxiliary handle front view. The handle includes a throat piece 1 that provides a means to attach a spring shaft 2 to the main shovel shaft. The spring shaft 2 provides a torsional spring means to bias the grip away from the main shaft. One implementation uses 1074/1075/1095, 1/16" thick coiled spring steel strip, with rounded edges. A grip 3 provides a means for the user to hold the auxiliary handle. A plurality of machine screws 4 secure the throat piece 1 to the spring shaft 2, where lock nuts on a reverse side (not shown) provide a means of securing the grip and the throat piece to the spring shaft. The grip and throat piece could also be injection molded (over molded) directly onto the spring steel shaft. In one embodiment, a single shovel with auxiliary handle can be done by simply including the throat piece attachment in the polymer blade. This embodiment thus molds a polymer shovel blade where the "throat piece" was part of the blade. This would actually make manufacturing simpler and less expensive.

Figure 2:
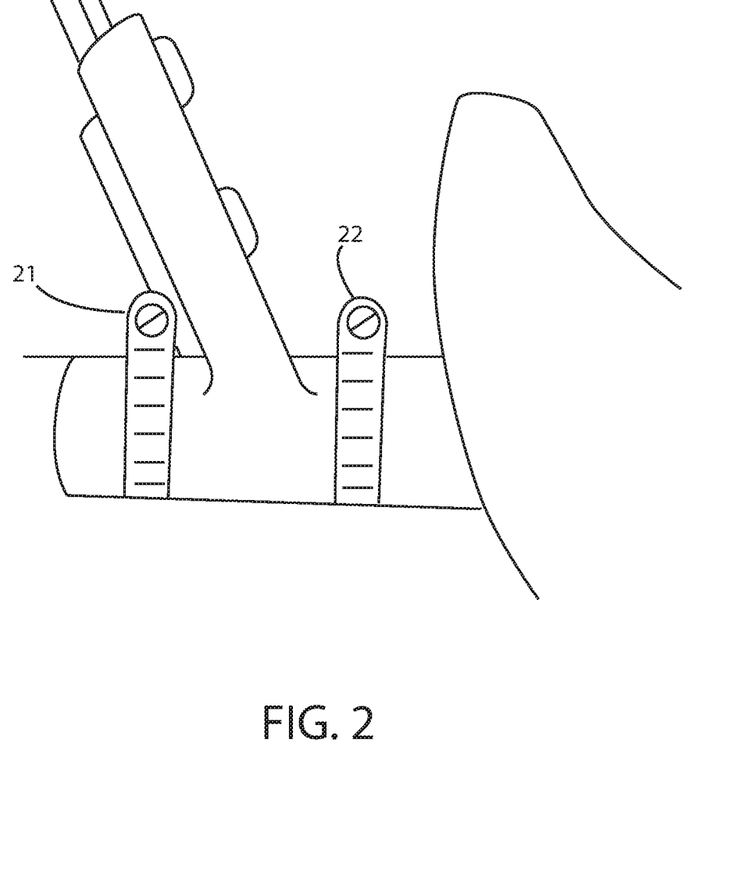
FIG. 2 shows an exemplary throat piece close up.

FIG. 2 shows a close up of the throat piece 1. The throat piece 1 has worm gears 21 and 22 that secure hose clamps (band clamps) of a horizontal portion of the throat piece 1 to the main shaft of shovel. The rear most hose clamp 21 impinges directly against angled portion of throat piece 1 to limit stress (bending) on a throat piece joint when an auxiliary shaft is flexed towards main shaft during shoveling.

Figure 3:
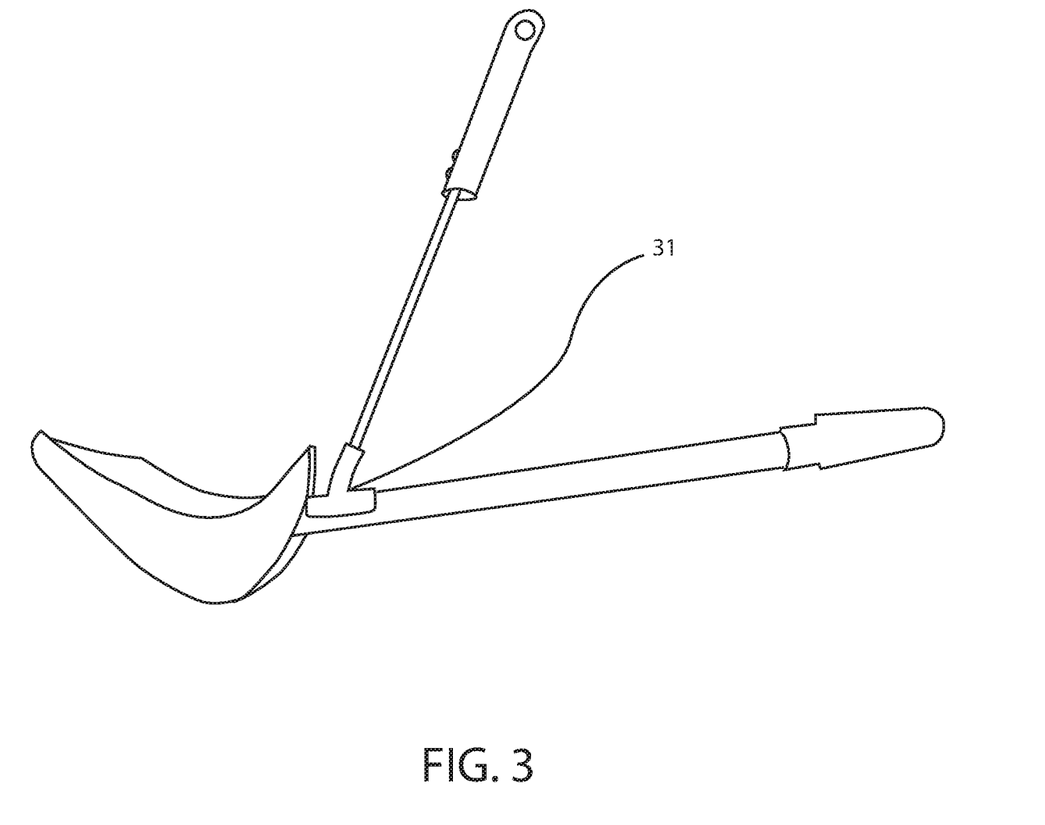
FIG. 3 shows an exemplary side view where the auxiliary handle is attached to main shaft of shovel.

FIG. 3 shows an exemplary side view illustrating an auxiliary handle attached to the main shaft of shovel through a join. The handle is positioned at a rest angle 31 between the main shaft and auxiliary shaft, and in one embodiment the rest angle is approximately 45 degrees.

Figure 4:
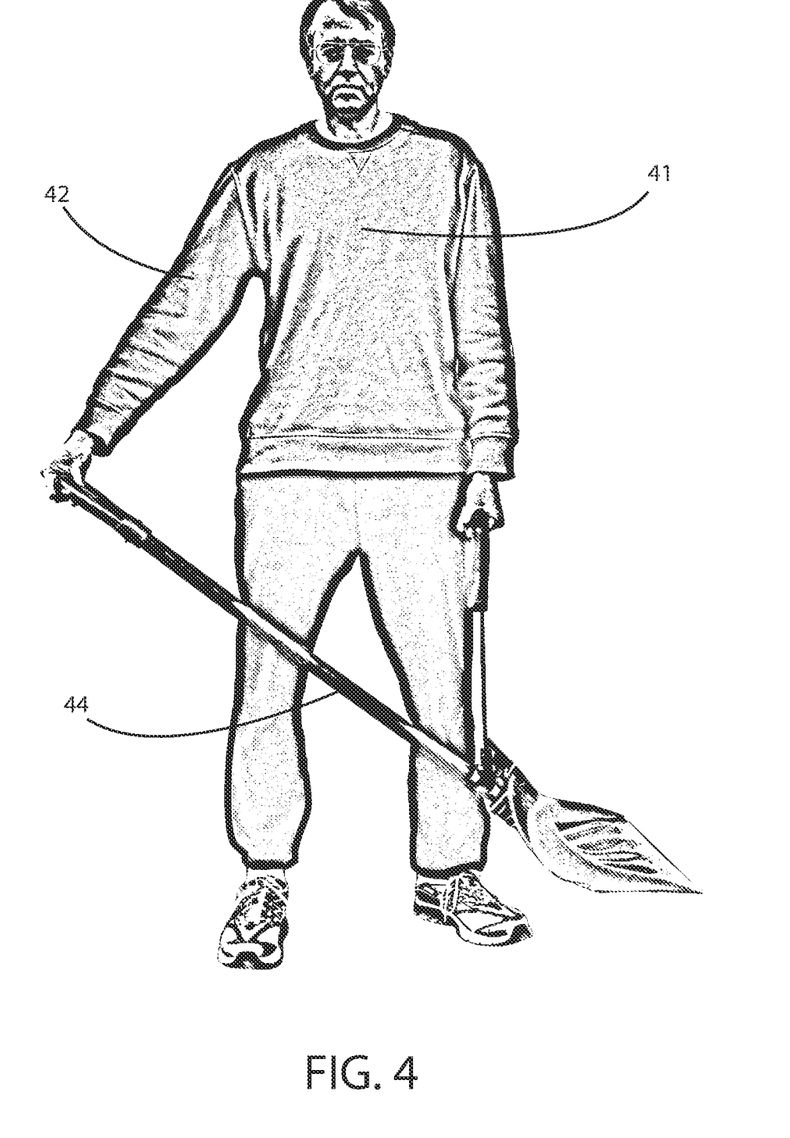
FIG. 4 shows exemplary correct ergonomic shoveling angles.

FIG. 4 shows an exemplary, correct ergonomic shoveling position for a user 41. An approximately straight, vertical line running from shoulder to throat piece is formed by the upper arm, lower arm, elbow and auxiliary handle. This is the optimal orientation for lifting the load vertically. In one embodiment, an approximately 45-degree angle is formed between outstretched arm 42 and vertical body line. An approximately 90-degree angle is formed between outstretched arm and main shovel shaft 44. This is the optimal angel for providing power during scraping or digging. An approximately 45-degree angle is formed between shovel and main shaft 44 and level ground. This is the optimal angle for scraping and gathering snow or other material, against the ground.

With this ergonomic geometry, the user faces the shovel arrangement, which is substantially parallel to the plane formed by the users outstretched arms. He or she can then discharge (throw) the snow or other load by swinging the arms, thus using primarily the strong muscles of the chest and upper body to do the work, as opposed to the relatively weak biceps and and triceps of the upper and lower arms. In one embodiment, the shovel plane is slightly in front of the user body plane, and both the shovel and body planes intersect at the user's shoulders so they are not exactly parallel. In other words, they may be almost, but not quite, coplanar.

Figure 5:
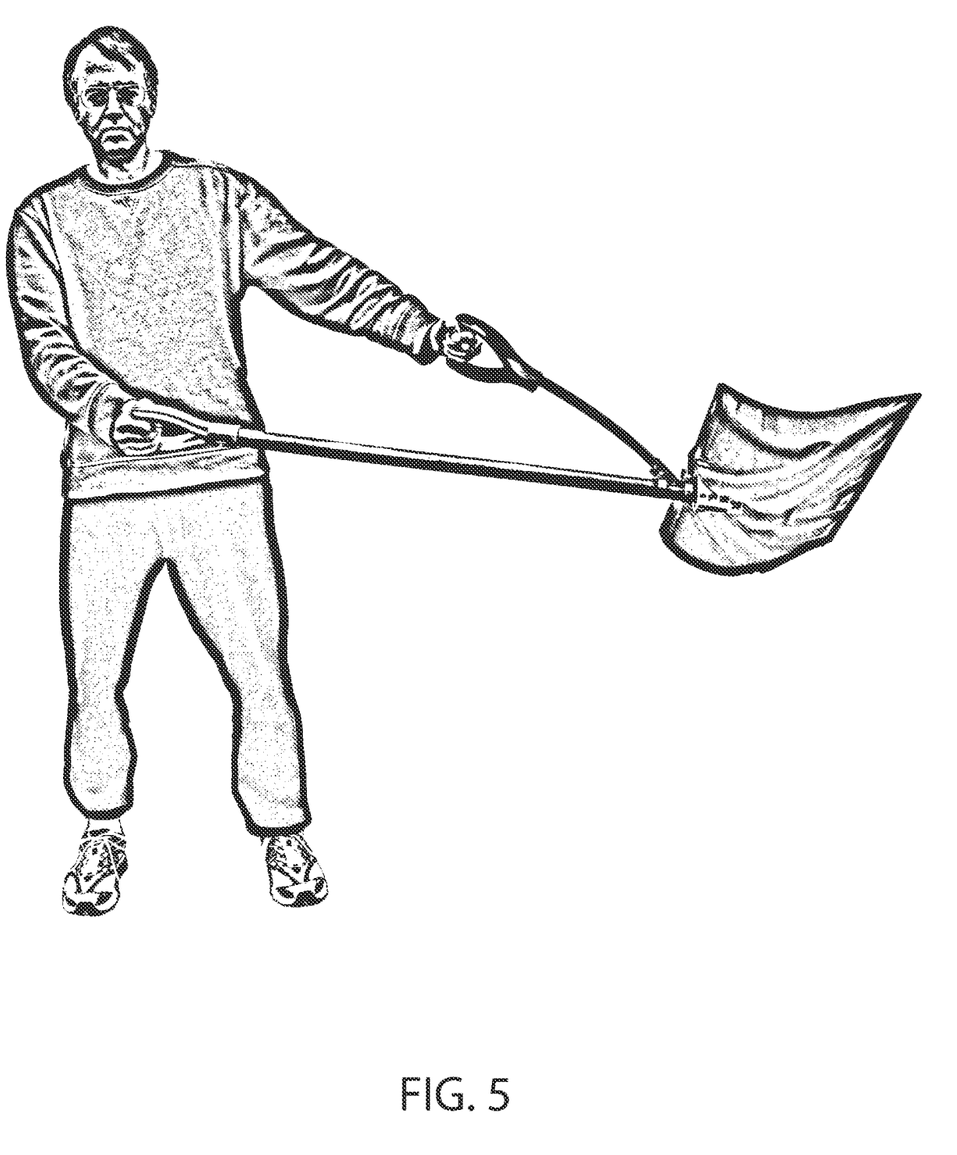
FIG. 5 shows an exemplary mid-throw.

FIG. 5 shows an exemplary mid-throw motion. During the mid-throw the arms are basically still out stretched, most of the lifting being accomplished by the muscles in the upper body. The auxiliary shaft begins to bend, under spring tension.

Figure 6:
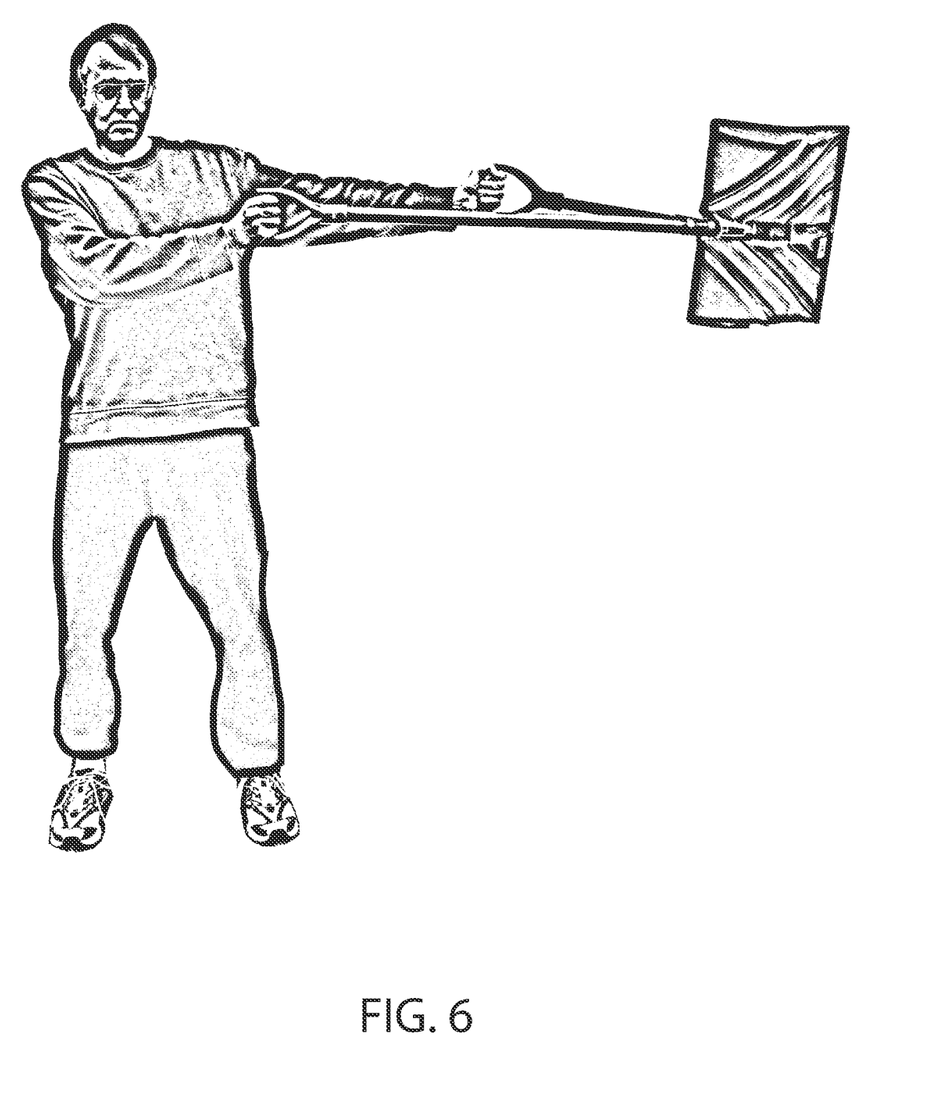
FIG. 6 shows an exemplary finished throw.

FIG. 6 shows an exemplary finished throw. At the end of the throw, the handle grips are approximately substantially parallel to each other and the auxiliary shaft is at maximum deflection, having absorbed the excess kinetic energy of the throw, gradually slowing the shovel to a stop. This kinetic energy is thus converted into potential energy, which will be used to return the shovel to the starting, ergonomic position.

Without the spring bias, excess kinetic energy is absorbed by the user in the form of a shock wave, which is extremely uncomfortable and potentially damaging. This effect is so severe that it renders rigid auxiliary handles ineffective under such lifting and throwing conditions.

Figure 7:
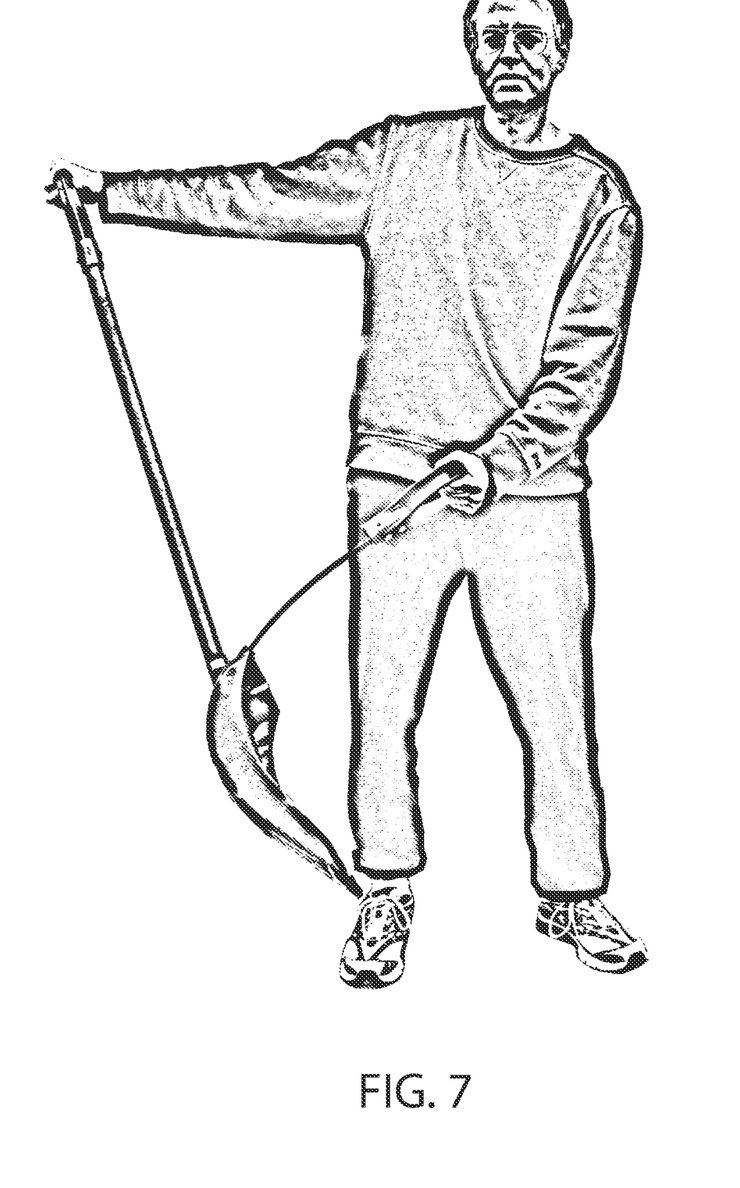
FIG. 7 shows an exemplary cocked position for added discharge power.

FIG. 7 shows one exemplary position that is locked for added discharge power. If the load is heavy, or the distance to be thrown is large, it becomes necessary to "cock" the shovel arrangement before throwing, in order to place sufficient force behind the throw. The auxiliary handle flexes forward, i.e., in the opposite direction of the flex during scraping or throwing, in order to facilitate the throw with sufficient force.

Figure 8:
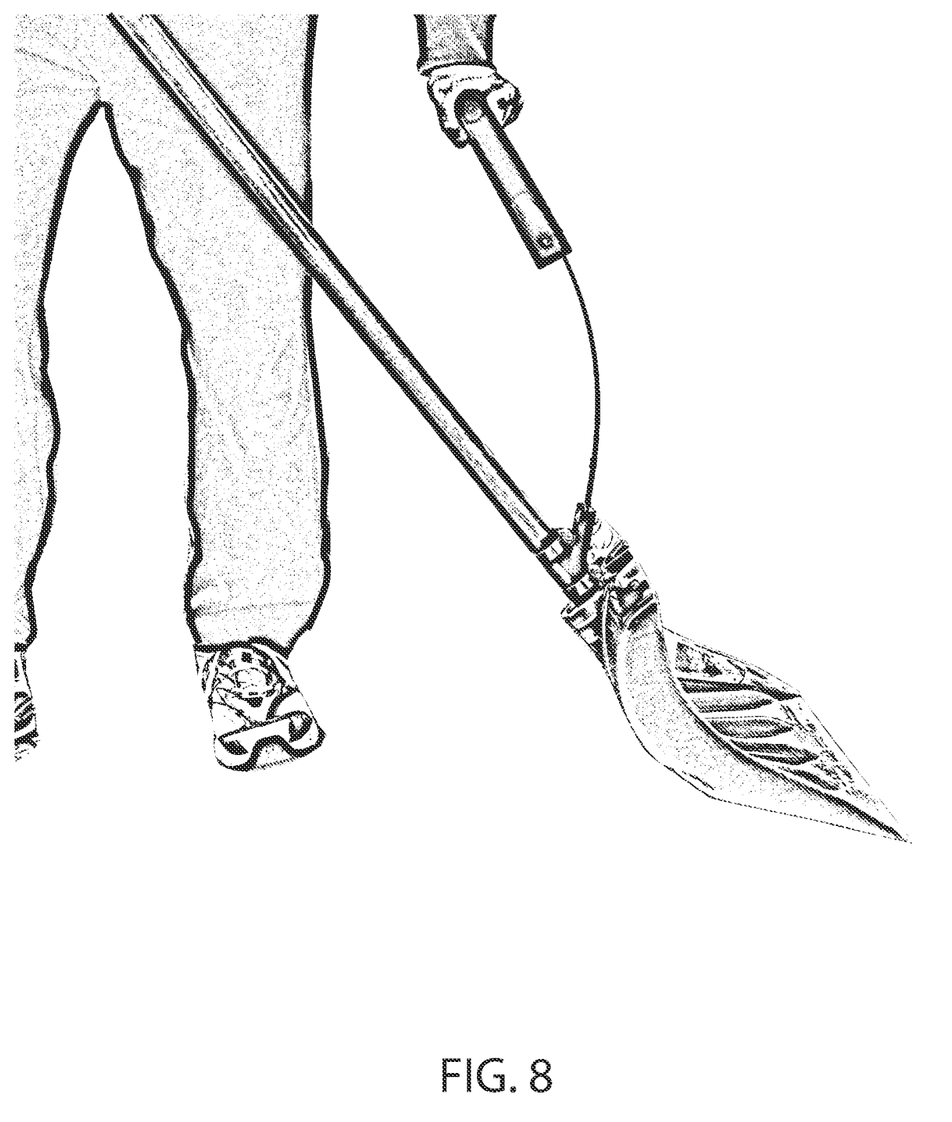
FIG. 8 shows an exemplary bent for added scraping power.

FIG. 8 shows an exemplary bent for added scraping power. For digging or scraping, a rigid auxiliary handle would be ideal, because all of the user force and energy would go into digging/scraping and none would need to be expended to keep the auxiliary handle from moving or slipping, relative to the main shaft. However, as has been noted, a rigid auxiliary handle is not practical or effective for the other aspects of shoveling. Thus a locking mechanism is desirable, i.e., a mechanism that momentarily "freezes" the movement of the auxiliary handle, relative to the main handle, during the act of digging or scraping. An active locking mechanism, such as a hand brake, that is consciously activated by the user, is complex to manufacture and difficult to use, repeatedly, by the user.

A passive locking mechanism, whereby the locking is activated automatically during scraping use, is disclosed in Rosenshine U.S. Pat. No. 5,431,468. However, this too is complex to manufacture and difficult to implement. The locking mechanism discussed herein is much simpler and more natural. When the user begins to scrape, the rest angle of 45 degrees causes two force components to be applied to the auxiliary handle. The first component is both perpendicular to and towards the main shaft, and tends to bend the auxiliary handle to the point where it is substantially parallel with the main shaft. This is the natural and ideal angular relationship for shoveling or digging. The second component of the force is along the longitudinal axis of the auxiliary shaft, substantially parallel to the main shaft, and towards the shovel blade. This component is tending to decrease the bending radius as more force is applied. The decreased bending radius increases the spring tension and tends to make subsequent decrease in radius more difficult. This feedback loop rapidly reaches the point where the handle is effectively and passively locked, partially, relative to the main shaft. This partial locking mechanism is quite effective and natural, and is much simpler to implement than that which is disclosed in Rosenshine U.S. Pat. No. 5,431,468.

Figure 9:
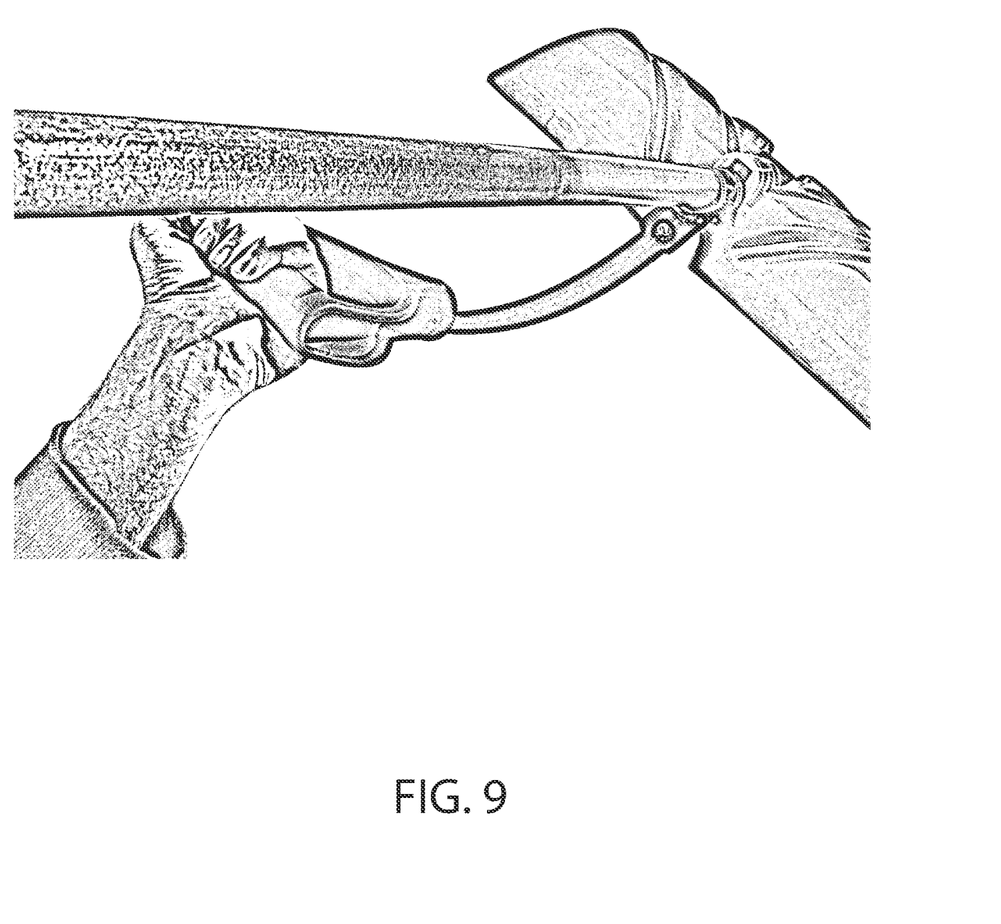
FIG. 9 shows an exemplary spring tension.

FIG. 9 shows an exemplary spring tension on the handle. The proper spring tension, along with the neutral attachment angle mentioned earlier, is key to constructing an effective auxiliary handle. As shown in FIG. 9, the ideal spring tension for an auxiliary handle, whereby the weight of the shovel itself, when inverted over the fixed position auxiliary handle, causes the spring to deflect to the point where the auxiliary handle grip approaches, but does not impact, the main shaft.

Figure 10:
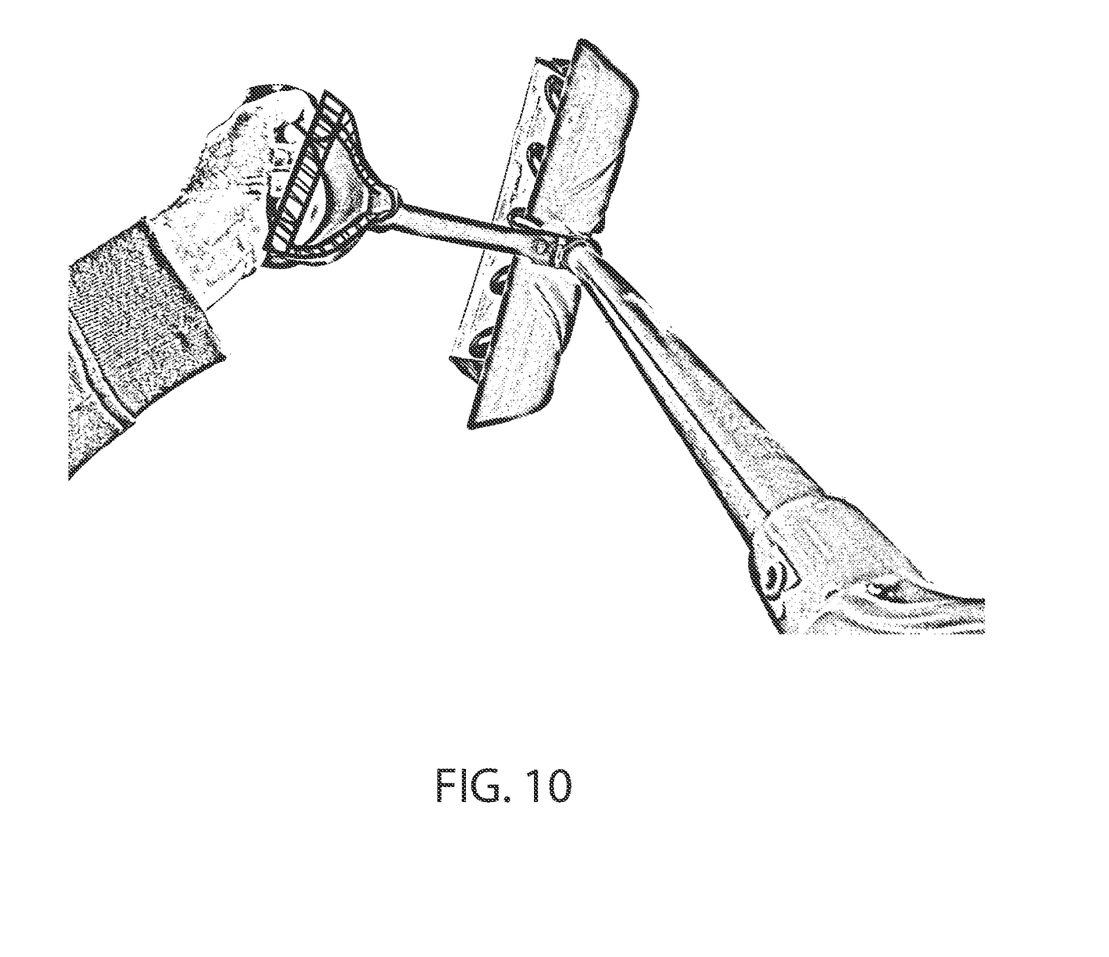
FIG. 10 shows an exemplary twist angle.

FIG. 10 shows an exemplary twist angle. The natural resting position of the auxiliary handle leaves the horizontal bar of the handle grip substantially parallel to the leading edge of the shovel blade. This is shown in FIG. 10 by the position of the crosshatched grip overlay depiction, relative to the shovel leading edge. If the direction of the throw is within the plane formed by the auxiliary shaft and the main shaft at rest, then the main and auxiliary shafts tend to remain together in this plane. However, if the direction of the throw deviates from this initial plane, it is desirable that the auxiliary handle grip can also deviate from this plane, i.e., it can twist and yaw modestly. This is depicted in FIG. 10, whereby the horizontal bar of the auxiliary handle grip is no longer parallel to the leading edge of the shovel blade (Twist). In addition, the bending motion of the auxiliary handle is no longer directly towards the main shaft. Rather it is aimed modestly above the main shaft (Yaw). The auxiliary shaft will automatically untwist and un-yaw, when appropriate, due to the counter torque and counter force imparted by the twisted spring shaft.

Figure 11:
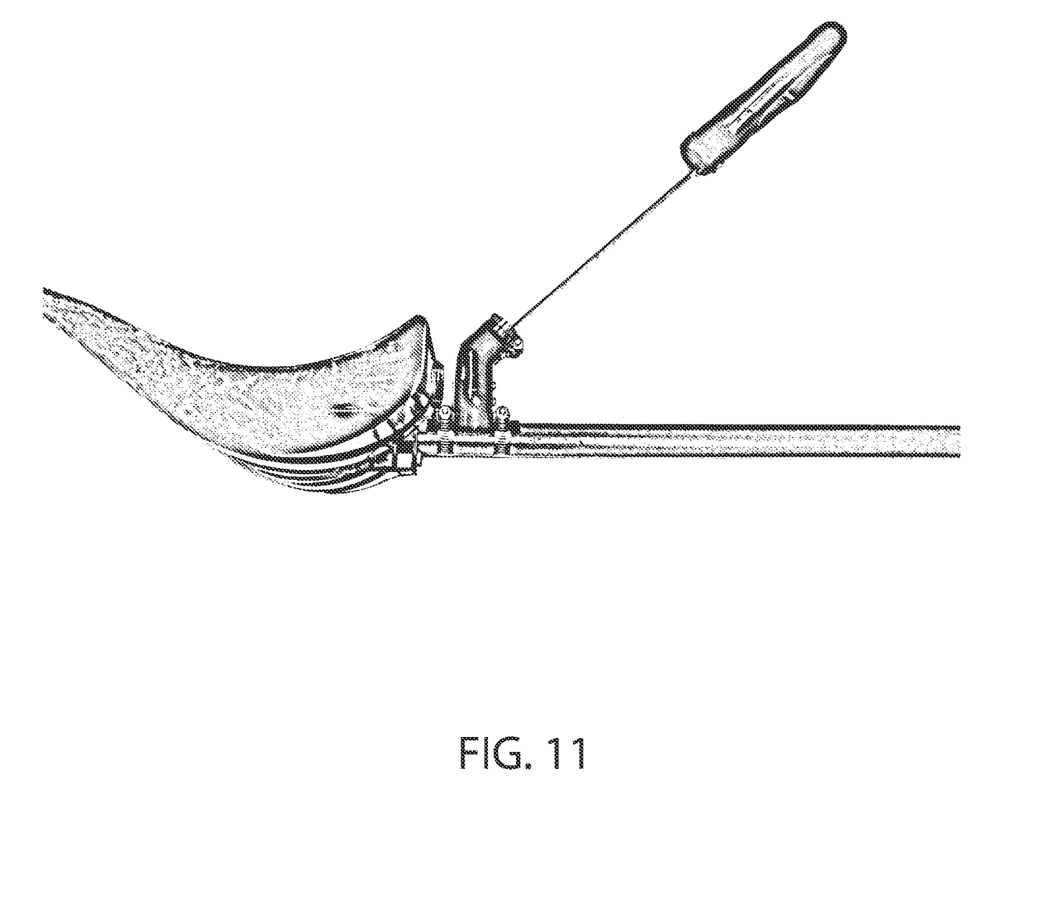
FIG. 11 shows an exemplary offset Throat Piece.

FIG. 11 shows an exemplary Offset Throat Piece. It may also be desirable to have the auxiliary shaft offset, perpendicular to the main shaft, while still maintaining the optimal 45 degree attachment orientation, as shown in FIG. 11. This allows the "effective" attach point of the shaft, in terms of lifting leverage, to be closer to the blade than would otherwise be physically possible: the effective attach point being the point where the line projected longitudinally through the auxiliary shaft intersects with the main shaft. This offset also affords a slightly different spring tension, for a given attach point, than would be the case with the non-offset attachment.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A digging implement, comprising:
    a main shaft having an upper end, a lower end, a top surface and a bottom surface, and a generally uniform cross section along a portion of its length;
    a first grip connected to the upper end of the main shaft;
    an end portion configured for digging, connected to the lower end of the main shaft; and
    a second grip; and
    an elongated bendable flat spring having a first end and a second end; and
    said first end coupled to the lower end of said main shaft, proximal to the top surface of the main shaft; and
    said second end connected to the second grip; and
    said elongated bendable flat spring is bendable along the entire length from said main shaft to said second grip, and when compressed, both axially toward the main shaft top surface and longitudinally toward the main shaft lower end, momentarily freezes, both axially and longitudinally, a movement of said second grip relative to the main shaft, with the grips remaining parallel to each other, during digging or scraping; and
    an angled joint coupling the said elongated bendable flat spring to the main shaft at a predetermined rest angle of approximately 45 degrees with said elongated bendable flat spring at neutral tension; and
    said elongated bendable flat spring providing torsional flexion to bias the second grip away from the main shaft; and
    said torsional flexion providing a force whose value is approximately that which is needed to suspend the second grip just short of touching the main shaft, when the main shaft is inverted directly over the second grip and parallel to the ground.

2. The implement of claim 1, wherein the elongated bendable flat spring forms an approximately straight, vertical line running from a shoulder through a corresponding upper arm, elbow, lower arm elbow and elongated bendable flat spring shaft when lifting a load vertically; and
    said main shaft and the user's other arm comprises an approximately 90-degree angle for providing maximal power during scraping or digging.

3. The implement of claim 1, wherein the main shaft remains substantially within a vertical plane throughout the entire cycle of digging or scraping, lifting, throwing and returning.

4. A handle configured to be used with a digging implement, the digging implement comprising:
  an elongated main shaft having an upper end and a lower end; and
  a generally uniform cross section along a portion of its length; and
  a top surface and a bottom surface; and
  a primary grip engaged with said upper end; and
  a digging blade engaged with said lower end; and
said handle comprising:
an elongated bendable flat spring having a first end and a second end; and
said first end of said elongated bendable flat spring engaged with a secondary grip; and
said second end of said elongated bendable flat spring fixedly engaged with said digging implement main shaft; and
said elongated bendable flat spring is bendable along the entire length from said main shaft to said second grip; and
said elongated bendable flat spring having an angled joint for coupling said bendable flat spring to said main shaft top surface and proximal to said lower end, at a predetermined rest angle of approximately 45 degrees with the spring at neutral tension; wherein
said elongated bendable flat spring when compressed, both axially toward the main shaft top surface and longitudinally toward the main shaft lower end, momentarily freezes, both axially and longitudinally, a movement of said secondary grip relative to the main shaft, with the primary and secondary grip remaining parallel to each other, during digging or scraping; and
said elongated bendable flat spring providing torsional flexion to bias the secondary grip away from the main shaft; and
said torsional flexion providing a force whose value is approximately that which is needed to suspend the secondary grip just short of touching the main shaft, when the main shaft is inverted directly over the secondary grip and parallel to the ground.

5. The handle of claim 4, wherein the main shaft remains substantially within a vertical plane throughout the entire cycle of digging or scraping, lifting, throwing and returning.

6. The handle of claim 4, wherein the handle allows the implement to be used such that the elongated bendable flat spring forms an approximately straight, vertical line running from a shoulder through a corresponding upper arm, elbow, lower arm, and secondary grip when lifting a load vertically; and said main shaft and the user's other arm comprises an approximately 90 degree angle for providing maximal power during scraping or digging.

7. A digging implement, comprising:
  a main shaft having an upper end, a lower end, a top surface and a bottom surface, and a generally uniform cross section along a portion of its length;
  a first grip connected to the upper end of the main shaft; and
  an end portion configured for digging, connected to the lower end of the main shaft; and
  a second grip; and
  an elongated bendable flat spring having a first end and a second end; and
  said first end coupled to the lower end, proximal to the top surface, of the main shaft and the second end connected to the second grip; and
  said elongated bendable flat spring bendable from said digging implement main shaft to said second grip; and
  said elongated bendable flat spring when compressed, both axially toward the main shaft top surface and longitudinally toward the main shaft lower end, momentarily freezes, both axially and longitudinally, a movement of said second grip relative to the main shaft, with the grips remaining parallel to each other, during digging or scraping; and
  an angled joint coupling the elongated bendable flat spring to the main shaft at a predetermined rest angle that falls within the range of approximately 30 to 50 degrees with a spring at neutral tension; and
  said elongated bendable flat spring providing torsional flexion to bias the second grip away from the main shaft.

8. The implement of claim 7 wherein the main shaft remains substantially within a vertical plane throughout the entire cycle of digging or scraping, lifting, throwing and returning.

* * * * *